(12) United States Patent
Wong

(10) Patent No.: US 9,166,429 B2
(45) Date of Patent: Oct. 20, 2015

(54) USB CHARGER USING CURRENT LIMIT

(75) Inventor: Chuck Wong, Union City, CA (US)

(73) Assignee: Intersil Americas LLC, Milpitas, CA (US)

( * ) Notice: Subject to any disclaimer, the term of this patent is extended or adjusted under 35 U.S.C. 154(b) by 652 days.

(21) Appl. No.: 12/428,741

(22) Filed: Apr. 23, 2009

(65) Prior Publication Data

US 2009/0295339 A1 Dec. 3, 2009

Related U.S. Application Data

(60) Provisional application No. 61/058,371, filed on Jun. 3, 2008.

(51) Int. Cl.
*H02J 7/00* (2006.01)

(52) U.S. Cl.
CPC ....... *H02J 7/0052* (2013.01); *H02J 2007/0059* (2013.01); *H02J 2007/0062* (2013.01)

(58) Field of Classification Search
USPC ................ 320/114, 162, 112, 107; 310/50; 362/183; 455/571, 572, 573
See application file for complete search history.

(56) References Cited

U.S. PATENT DOCUMENTS

| | | | | |
|---|---|---|---|---|
| 4,308,493 A | * | 12/1981 | Kothe et al. | 320/152 |
| 6,493,404 B1 | * | 12/2002 | Iizuka et al. | 375/343 |
| 6,946,817 B2 | * | 9/2005 | Fischer et al. | 320/132 |
| 7,170,259 B2 | * | 1/2007 | Veselic | 320/114 |
| 8,063,621 B2 | * | 11/2011 | Harriman | 323/284 |
| 2006/0287007 A1 | * | 12/2006 | Veselic et al. | 455/572 |
| 2007/0035276 A1 | * | 2/2007 | Webjorn | 320/114 |
| 2007/0188134 A1 | * | 8/2007 | Hussain et al. | 320/114 |
| 2008/0084180 A1 | * | 4/2008 | Hasegawa | 320/112 |
| 2009/0174366 A1 | * | 7/2009 | Ahmad et al. | 320/114 |

* cited by examiner

*Primary Examiner* — Drew A Dunn
*Assistant Examiner* — Steve T Chung
(74) *Attorney, Agent, or Firm* — Fogg & Powers LLC

(57) ABSTRACT

A universal serial bus charger comprises a universal serial bus connector for providing a connection to a voltage source. An output voltage connector provides a charging voltage to a connected battery. A switching voltage regulator generates the charging voltage responsive to the voltage source. Control circuitry monitors an actual charging current applied to the connected battery and provides a programmed current signal enabling the actual charging current to operate at a programmed level if the actual charging current does not exceed a programmed charging current level. The control circuitry provides a charging current limit signal enabling the actual charging current to operate at a predetermined charge current limit if the actual charging current exceeds the programmed charging current level. PWM control circuitry generates switching control signals to control operation of the switching voltage regulator responsive to the control circuitry.

19 Claims, 6 Drawing Sheets

USB CHARGER USING CURRENT LIMIT

CROSS-REFERENCE TO RELATED APPLICATIONS

This application claims benefit from U.S. Provisional Application No. 61/058,371, filed Jun. 3, 2008 and entitled ADAPTIVE CURRENT LIMIT FOR USB CHARGER APPLICATIONS, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
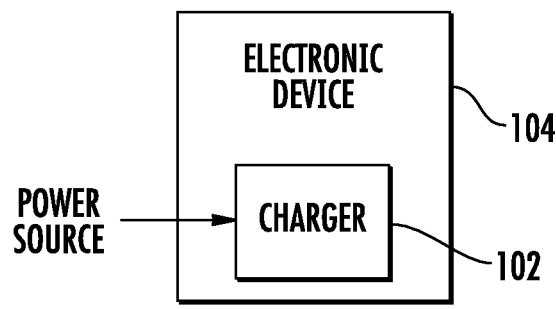
FIG. 1 is a block diagram of an electronic device with associated battery charger.

Referring now to the drawings, wherein like reference numbers are used herein to designate like elements throughout, the various views and embodiments of a USB charger using sensor-less current limits are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Since the universal serial bus specification provides a 5V power supply, it is possible to use a USB port as a power source for recharging batteries. Products based on this approach include chargers designed to charge standard Li-ion cells, nickel metal hydride cells, and custom nickel metal hydride batteries with built-in USB plugs. This type of circuitry eliminates the need for a 5V wall adapter.

USB interfaces had become more and more popular. Many handheld electronic devices such as mobile phones, PDAs, MP3 players, digital cameras, etc. have been designed to enable the battery to be charged through its USB port. This type of charging utilizes a USB provided power source to charge the battery. However, there are strict guidelines that must be met when utilizing a USB port to charge a battery. One major restriction is that the maximum current that can be drawn from a USB source is limited to 500 mA for a self powered port and 100 mA for a bus powered port. A bus powered port is a port that obtains its power from an upstream USB port.

Battery powered electronic devices are configured to be charged in a number of different fashions. Since the maximum current that can be drawn from a USB port is limited to 500 mA for self powered ports and 100 mA for bus powered ports, the use of a switching charger may prove beneficial for charging the battery at a higher rate with limited input current to the charger as opposed to the use of a linear charger.

Within existing USB powered charging current configurations, a current sensing resistor is needed on the input path from the voltage source to monitor the input current to ensure that the charging current does not exceed the imposed charging current limits. Additionally, current sensing is needed at the battery connection to regulate the charging current. The current sensing resistor on the input path causes power loss within the charger circuitry and adds costs to the manufacture of the charging system. The input current sensor resistor is normally integrated in the charger IC using polysilicon resistors. The untrimmed tolerance of the poly resistors is normally quite large (typically 20%-30%) due to process variations in manufacturing of the silicon wafer. To achieve greater accuracies the addition of trim circuitry is necessary and this will require significant increases in the die area necessary for the charger circuitry. Thus, some manner of overcoming these problems is desired.

Referring now to the drawings, and more particularly to FIG. 1, there is illustrated a general block diagram of a battery charger and electronic device. A battery charger 102 is interconnected with an electronic device 104 having a battery associated therewith. Battery charger 102 charges the associated electronic device 104 battery responsive to a provided power source to the battery charger 102. This power source could comprise an AC adaptor, an USB port or any other type of source able to provide a voltage source to the charger 102 for charging the battery of the electronic device 104.

Figure 2:
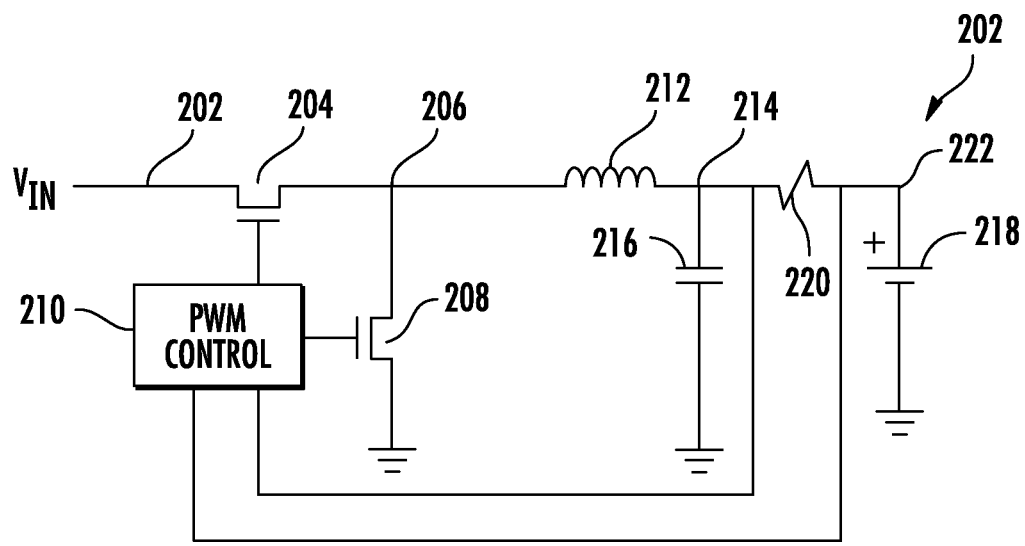
FIG. 2 is a general schematic diagram of a battery charger circuit and battery.

FIG. 2 is a general schematic diagram of charging circuitry 202. The input voltage $V_{IN}$ from a power source is provide at an input node 202 across a high side switching transistor 204 between nodes 202 and 206. The low side switching transistor 208 is connected between node 206 and ground. Each of transistors 204 and 208 are controlled by PWM control circuitry 210. The PWM control circuitry 210 receives additional control inputs from other sources as will be described herein below. An inductor 212 is connected between nodes 206 and node 214. A load capacitor 216 is connected between node 214 and ground. A current sensing resistor 220 is connected between node 214 and 222. Finally, the battery 218 is connected to the voltage output node $V_{OUT}$ at node 222. The positive terminal of the battery is connected to node 222 and the negative terminal of the battery 218 is connected to ground.

Figure 3:
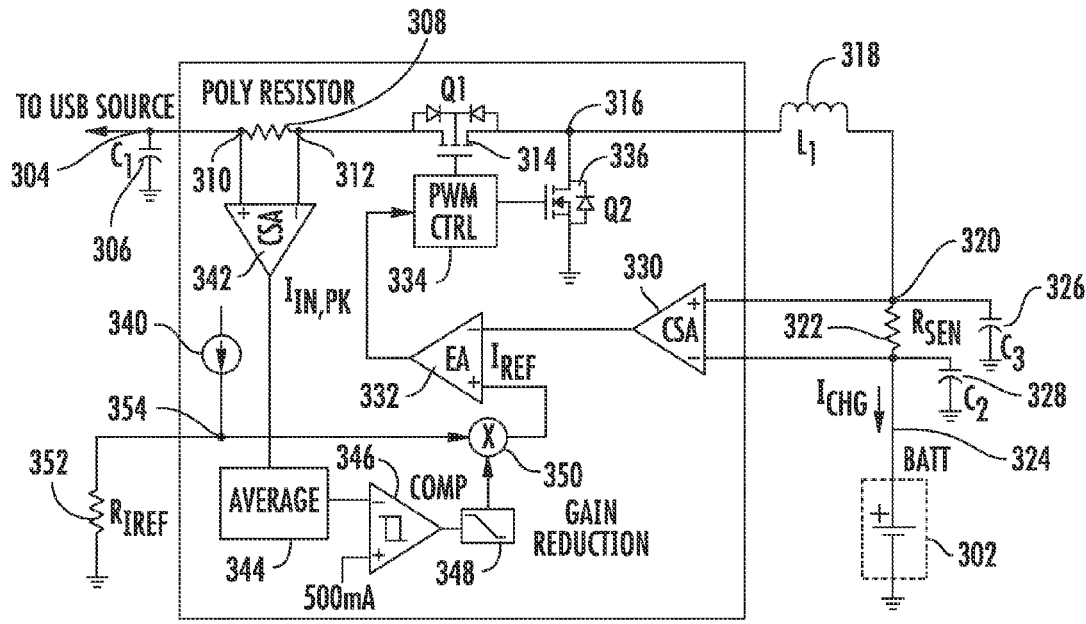
FIG. 3 illustrates a typical USB current limiting scheme using dual sensing resistors.

FIG. 3 illustrates a schematic diagram of a typical USB current limiting scheme using an input current sensing poly resistor for charging a battery 302. The charging circuitry is connected at node 304 to a USB power source. A capacitor 306 is connected between node 304 and ground. The charge current is provided through a poly resistor 308 that is included within the charging circuitry. The poly resistor 308 is connected between nodes 310 and 312, and a switching transistor 314 is connected between node 312 and node 316. An inductor 318 is connected between node 316 and node 320. The charge current passes through a current sensing resistor 322 between node 320 and node 324. The positive terminal of the battery is connected to node 324. A first capacitor 326 is connected between node 320 and ground and a second capacitor 328 is connected between node 324 and ground. The resistor 322 detects the charge current being applied to the battery 302.

A non-inverting input of a current sense amplifier (CSA) 330 is connected to node 320. The inverting input of the current sense amplifier is connected to node 324. The current sense amplifier 330 generates the signal $I_{CHG}$ at its output responsive to the voltage drop across the current sensing resistor 322. The output of the current sense amplifier 330 is provided to the inverting input of an error amplifier 332. The non-inverting input of the error amplifier 332 is connected to receive a reference signal $I_{REF}$. The output of error amplifier 332 comprises the difference between the $I_{CHG}$ and $I_{REF}$ signals and is provided to PWM control circuitry 334. The PWM control circuitry 334 responsive to the error amplifier signal generates control signals to switching transistors 314 and 336. Transistor 336 has its drain/source path connected between node 316 and ground. The drain/source path of transistor 314 is connected between node 312 and node 316.

The $I_{REF}$ is a reference signal for the charging current through resistor 322. The current source 340 provides a bias current to the external resistor that sets the nominal charging current. The input current $I_{IN}$ is measured through the poly resistor 308. The non-inverting input of the current sense amplifier 342 is connected to node 310 while the inverting input of the current sense amplifier 342 is connected to node 312 on the other side of the current sense resistor 308. The output of the current sense amplifier 342 provides signal $I_{IN}$ which is averaged at averaging circuitry 344 with previous inputs. The output of the averaging circuitry 344 is provided to the negative input of a comparator 146. The positive input of the comparator 346 is connected to a 500 mA reference current value. The output of the comparator 346 is connected to the gain reduction circuit 348, and the output of the gain reduction circuit 348 is connected to a multiplier circuit 350 which multiplies the nominal charging reference signal $I_{REF}$ with a reduction gain should the input current reach 500 mA. If the input current is below 500 mA, no gain reduction is needed, i.e. $I_{REF}$ will equal to the voltage at node 354. The voltage at node 354 is programmed by a resistor $R_{IREF}$ 352 connected between node 354 and ground.

Figure 4A:
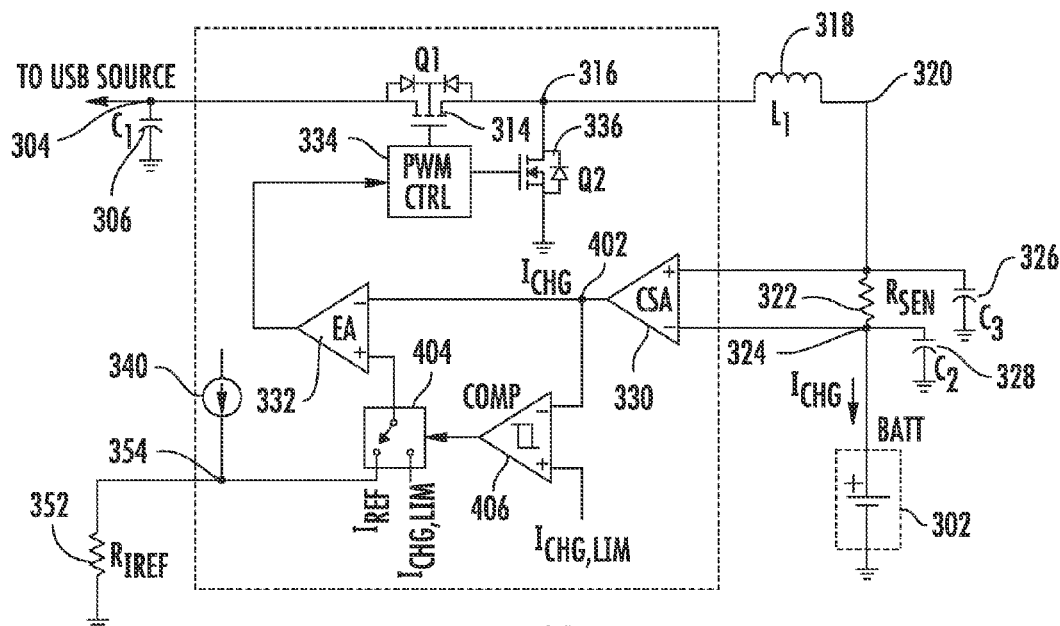
FIG. 4a illustrates an adaptive USB current limiting scheme.

In order to improve upon the problems of excessive power loss to the sensing resistor 308 and increase in die area due to trimming circuitry associated with the sensing resistor 308, the circuitry of FIG. 4a may be utilized to provide a charging circuitry with a sensor-less current limit scheme. In this embodiment, the USB input source is connected to node 304. The capacitor 306 is connected between node 304 and ground. Rather than using a poly resistor to sense the input current, the input current is applied directly through switching transistor 314 to node 316. Inductor 318 is connected between node 316 and node 320. Sensing resistor $R_{SEN}$ 322 is connected between node 320 and node 324. The positive terminal of battery 302 is connected to node 324 and capacitors 326 and 328 are connected to nodes 320 and 324 respectively. According to the current disclosure, the battery 302 may comprise a single cell battery for handheld devices but additionally may also apply to devices that operate using multiple battery cells (e.g. notebook/computer).

The current sensing amplifier 330 has its non-inverting input connected to node 320 and its inverting input connected to node 324. This enables the current sense amplifier 330 to measure the output charging current $I_{CHG}$ passing through resistor $R_{SEN}$ 322 and provide an indication of this value at its output to node 402. The output of the current sense amplifier 330 is connected to the inverting input of an error amplifier 332. The non-inverting input of amplifier 332 is connected to a switch mux 404 selecting either reference signal $I_{REF}$ or $I_{LIM}$, depending on the charging current signal $I_{CHG}$. The value of $I_{REF}$ is programmable via the resistor 352. The other input of the switch 404 is connected to a charge limit signal $I_{LIM}$ which is provided by the circuitry described in FIG. 5 which will be discussed herein below. The output of the error amplifier 332 is provided as a control input to the PWM controller 334 which provides control signals to the gates of transistors 314 and 336. The error amplifier 332 measures the differences in value between the charging signal $I_{CHG}$ and either the signal $I_{REF}$ or $I_{LIM}$ and provides this as a control signal to the PWM control circuitry 334 which allows the switching signal to drive the charging current to substantially equal to a current associated with $I_{REF}$ or $I_{LIM}$.

The switch 404 which selects the signal $I_{REF}$ or $I_{CHG,LIM}$ is operated responsive to the output of a comparator 406. Comparator 406 compares the signal $I_{CHG}$ to the signal $I_{LIM}$ that is provided as discussed therein below to determine if the charging current has exceeded the current limit. If the charging current signal $I_{CHG}$ is greater than the calculated $I_{LIM}$, $I_{LIM}$ is selected as a reference value to regulate the charging current; otherwise $I_{REF}$ will be selected as the reference value. This will ensure that the charger delivers maximum current to the battery without exceeding the input current limit. The comparator 406 should have a hysteresis implemented with in the circuit. When the current rises to reach ILIM, the comparator output toggles and changes the output of switch 404. Once this happens, the inverting input has to be lower than the non-inverting input by certain amount to allow toggling of the comparator output again. This prevents chatter in the comparator 406 when the charging signal $I_{CHG}$ is equal to the limit current signal $I_{CHG,LIM}$.

Figure 4B:
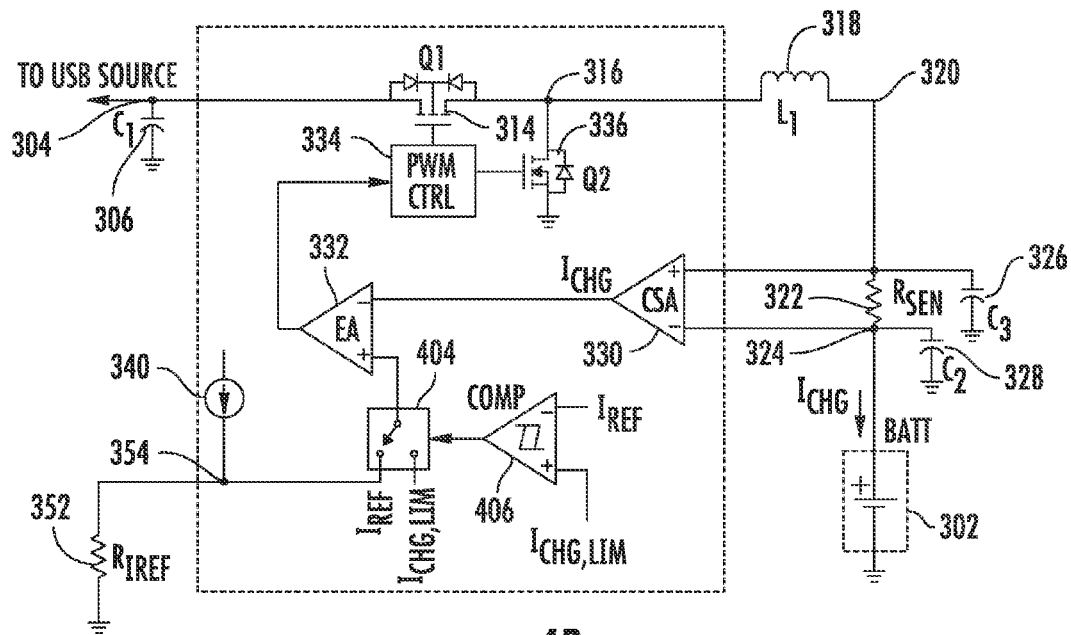
FIG. 4b illustrates an alternative embodiment of the adaptive USB current limiting scheme.

FIG. 4b illustrates an alternative preferred embodiment of the circuitry described with respect to FIG. 4a. The circuitry remains the same as that described with respect to FIG. 4a except that the inverting input of the comparator 406, rather than being connected to the output of the current sense amplifier 330 is connected to receive the reference signal $I_{REF}$. This voltage signal is the same as the $I_{REF}$ signal applied to the input of switch 404.

Figure 5:
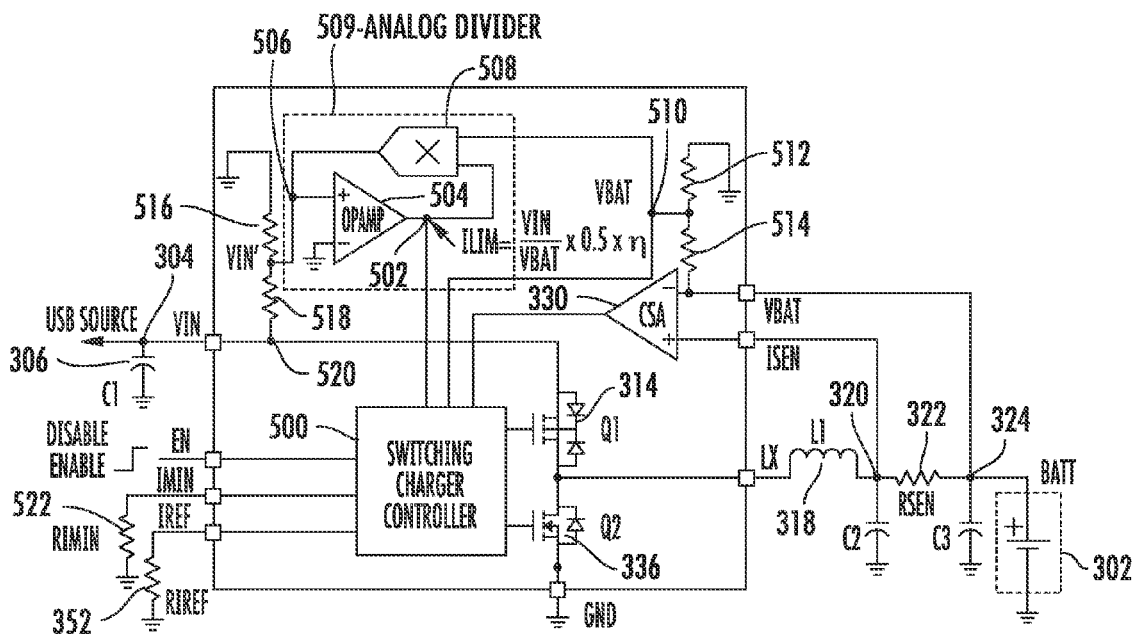
FIG. 5 illustrates the circuitry for generating the limit current based upon power balancing.

Referring now to FIG. 5, there is illustrated the circuitry for generating the current limit signal $I_{LIM}$. Previously discussed components and nodes of FIG. 4a are illustrated with the same reference numbers within FIG. 5. The switching charger controller 500 includes the PWM controller 334, error amplifier 332, switch mux 404, comparator 406 and current source 340 described previously with respect to FIG. 4. The $I_{LIM}$ signal provided to the positive input of comparator 406 and to the switch 404 is generated at node 502 at the output of operational amplifier 504.

The operational amplifier 504 has its inverting input connected to ground and its non-inverting input connected to node 506. The input node 506 is also connected to the output of an analog multiplier 308. The output of the operation amplifier 504 is connected to one input of the analog multiplier 508 at node 502. The other input of the analog multiplier 508 is connected to the battery voltage $V_{BAT}$ at node 324, through resistor divider 512 and 514. Node 510 is connected to the $V_{BAT}$ pin through a voltage divider circuit consisting of resistors 512 and 514. The non-inverting input of the amplifier 504 is also connected at node 506 to a voltage divider circuit consisting of resistors 516 and 518. Resistor 516 is connected between node 506 and ground. Resistor 518 is connected between node 506 and node 520 which is connected to the input voltage pin $V_{IN}$ for receiving the charging source voltage. The end-of-charge current is programmed via a resistor $R_{IMIN}$ 522 that is connected to the $I_{MIN}$ pin of the device.

The sensor-less current limit scheme illustrated in FIGS. 4a, 4b and 5 is based on the principal of energy conservation, i.e. the input power provided at the input node 304 equals the output power provided at pin $V_{BAT}$ plus the power loss of the charger during the power conversion. The current limit $I_{CHG,LIM}$ is calculated in the circuit shown in FIG. 3 according to the equation:

$$I_{CHG,LIM} = \frac{\eta \times V_{IN} \times I_{IN,LIM}}{V_{BAT}};$$

where $I_{CHG,LIM}$ is the maximum current that can charge a battery; $I_{IN,LIM}$ is the input current limit, which is either 500 mA or 100 mA depending on the USB port type; $\eta$ is the efficiency of the power conversion; $V_{IN}$ and $V_{BAT}$ are the input voltage and battery voltage, respectively.

To implement this equation, an analog divider 509 is required. The analog divider 509 is implemented by the configuration of the analog multiplier 508 as illustrated in FIG. 5. In analog design, to implement the equation A=B/C (where B and C are inputs, and A is an output) we implement the circuit for B=A×C by connecting the output to A. This is what is done in the configuration of the analog multiplier 508 and of amplifier 504 of FIG. 5. These circuits are connected to provide the $I_{LIM}$ signal according to the equation:

$$I_{LIM} = \frac{V_{IN}}{V_{BAT}} \times 0.5\eta.$$

Figure 6:
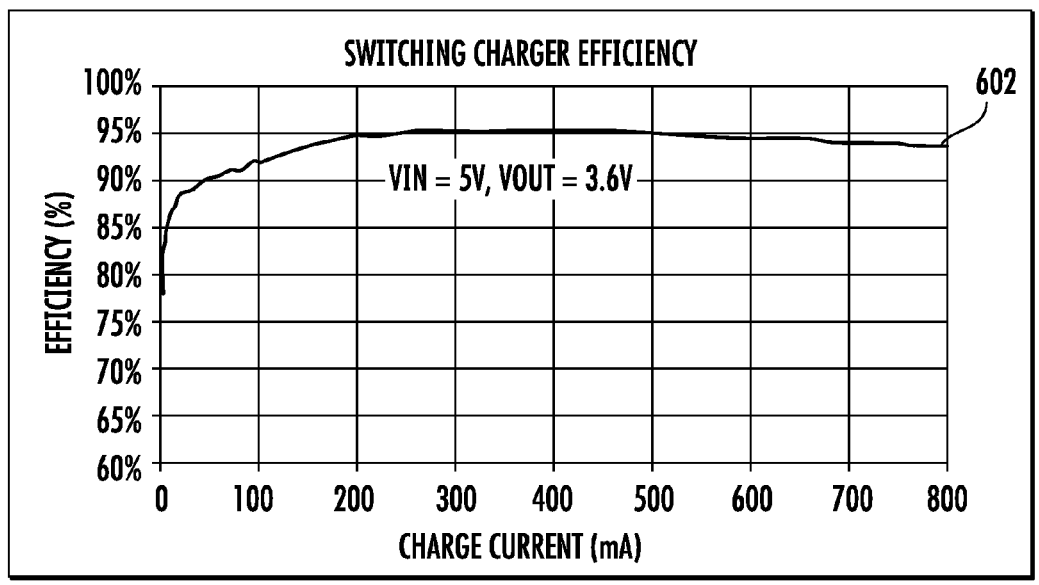
FIG. 6 illustrates the typical efficiency of a switching charger.

The efficiency $\eta$ of a switching regulator, although not constant in general, is relatively flat when the output current is sufficiently large. In the present case, the current limit is only in effect when the output current is greater than 100 mA. Thus, the effective range for the equation is in a range of 100 mA to 800 mA. Over this range, the efficiency is greater than 90% and is reasonably constant as is illustrated in FIG. 6. In FIG. 6 the efficiency illustrated generally by the line 602 ranges from approximately 92%-95% over the range from 100 mA to 800 mA. To provide an adequate safety margin 0.9 is used for $\eta$ the efficiency of the power conversion.

In the sensor-less current limit scheme, if the actual charge current is smaller than the calculated current limit $I_{CHG,LIM}$, no adjustment is needed to the provided charging current, and the charger can continue to charge the battery at the current set by the resistor $R_{IREF}$ 352. However, when the actual charging current is greater than the current limit $I_{CHG,LIM}$, the calculated current limit will then take effect becoming the new reference charging current of the charging circuitry by activating the switch mux 404 to provide the right current limit $I_{LIM}$.

Figure 7:
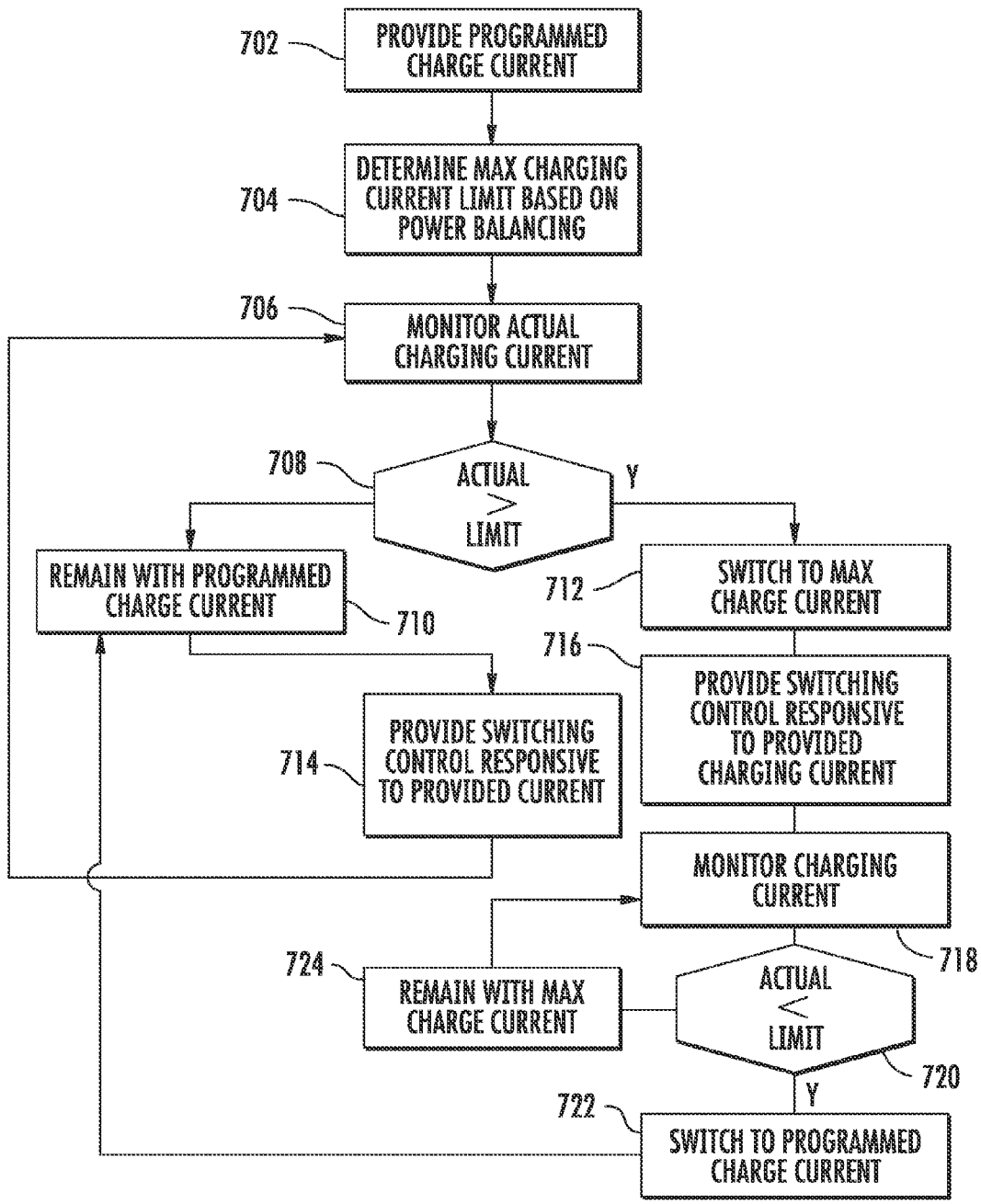
FIG. 7 is a flow diagram illustrating the operation of the circuitries of FIGS. 3 and 4.

This process is more fully illustrated in flow chart in FIG. 7. Initially, the programmed charge current $I_{CHG}$ is provided to the battery at step 702. The programmed charge current is established responsive to the programmed resistor $R_{IREF}$. Next, at step 704 the maximum charging current limit is been determined based upon power balancing techniques according to the equation for $I_{CHG,LIM}$. The current sense amplifier 330 monitors at step 706 the actual charging current $I_{CHG}$ being provided to the battery 302. At inquiry step 708, a determination is made if the actual current $I_{CHG}$ is greater than the programmed limit current $I_{LIM}$ using the comparator 406. If not, the switch 404 continues to provide the signal $I_{REF}$ and thus, the programmed charge current at step 710. If inquiry step 708 determines that the actual charging current has exceeded the programmed charging current limit, the comparator 406 causes switch mux 404 to provide the signal $I_{CHG,LIM}$, and thus switch to the maximum allowable charging current limit at step 712. After step 710, the circuit will provide switching control using the PWM control circuit 334 to generate the charging current to the battery at step 714 according to the program charge current. Control passes back to step 706 to monitor the charging current. After step 712, the circuit will provide the switching control using the PWM control circuit 334 to generate the charging current to the battery at step 716 according to the maximum charge current. Next, at step 718, the current is again monitored and inquiry step 720 determines whether the actual charging current is now less than the charging current limit. If not, the circuit continues to provide the maximum charging current at step 724 and control passes back to step 718 to monitor the charging current. When the actual charging current is less than the charging current limit as determined at inquiry step 720, the circuitry switches back to the program charge current at step 722. Control then returns to step 710.

Figure 8:
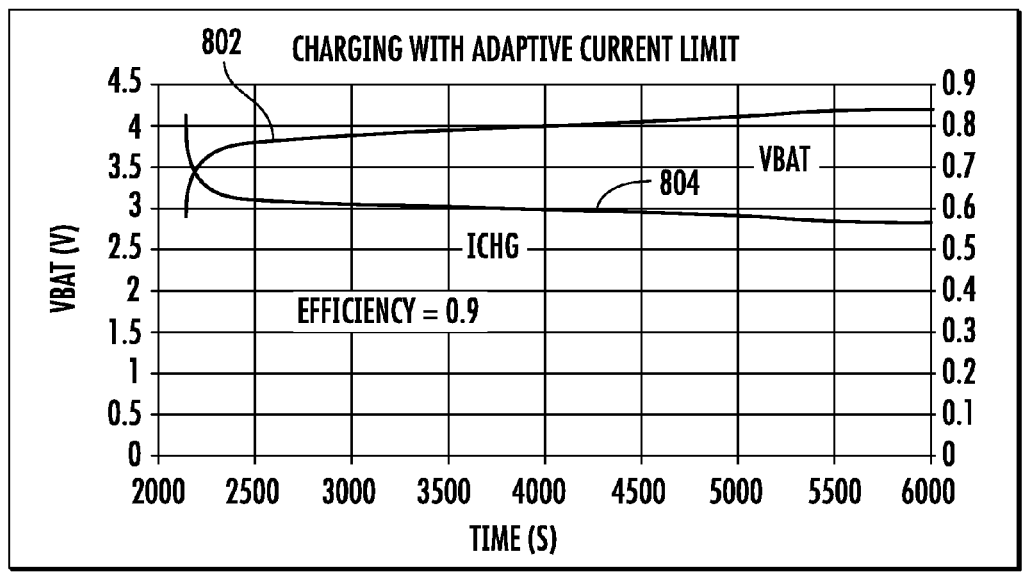
FIG. 8 illustrates the typical charging curves using the sensor-less current limiting techniques of FIGS. 4a, 4b and 5.

Using the sensor-less current limit scheme for charging a battery, the charging curves illustrated in FIG. 8 may be achieved. Line 802 comprises the battery charging voltage $V_{BAT}$. The line 804 shows the associated charging current $I_{CHG}$ associated with the battery charging voltage $V_{BAT}$. The input current limit is set to 500 mA, and the efficiency value used in the calculation is 0.9 as discussed herein above. The average constant current in the illustrated case is approximately 600 mA. Using the above described configuration, no input sensing current is needed for operating the charger. This enables the monitoring of the input current without the need for a current sensing poly resistor. It is based on the fact that the input power equals output power loss during the conversion. The charging current limit is a gap of the adjusted to deliver the maximum current to the battery without exceeding the input current limit.

It will be appreciated by those skilled in the art having the benefit of this disclosure that this USB charger using sensor-less current limit provides an improved battery charging device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A universal serial bus charger, comprising:
    a universal serial bus connector for providing a connection to a voltage source;
    an output voltage connector for providing a charging voltage to a connected battery;
    a switching voltage regulator for generating the charging voltage responsive to the voltage source and PWM switching control signals, wherein the switching voltage regulator includes a plurality of switching transistors, and at least one switching transistor of the plurality of switching transistors is connected directly to the universal serial bus connection;
    analog control circuitry for monitoring an actual charging current applied to the connected battery and generating a reference charge level signal at a non-zero level, the analog control circuitry determining a difference between the actual charging current and the reference charge level signal, the analog control circuitry including a comparator for comparing the actual charging current with a charging current limit level and determining if the actual charging current exceeds the charging current limit level, and responsive to the determining, the analog control circuitry generating the reference charge level signal at a first value if the actual charging current does not exceed the charging current limit level and generating the reference charge level signal at a second value if the actual charging current exceeds the charging current limit level, the second value associated with the charging current limit level, wherein the analog control circuitry includes an analog divider circuit for receiving an input voltage from the voltage source, a battery voltage of the connected battery, and a current limit value associated with the voltage source, and generating the charging current limit level as an analog signal based on the input voltage from the voltage source, the battery voltage of the connected battery, the current limit value associated with the voltage source, and a predetermined efficiency value associated with a power conversion of the switching voltage regulator; and a PWM control circuit for generating the PWM switching control signals to control operation of the switching voltage regulator responsive to the difference between the actual charging current and the reference charge level signal at the first value when the charging current does not exceed the charging current limit level and responsive to the difference between the actual charging current and the reference charge level signal at the second value when the charging current exceeds the charging current limit level.

2. The universal serial bus charger of claim 1, wherein the analog control circuitry further includes:
a current source for providing a fixed current;
a resistor having a user selected value; and
wherein the first value for the reference charge level signal is generated responsive to the current source and the resistor.

3. The universal serial bus charger of claim 1, wherein the analog control circuitry further comprises:
the comparator for determining if the monitored actual charging current exceeds the charging current limit level and generating a switching output responsive thereto;
a switch connected to receive the first value for the reference charge level signal and the second value of the reference charge level signal responsive to the switching output of the comparator.

4. The universal serial bus charger of claim 1, wherein the analog control circuitry further comprises an error amplifier for providing the difference between the actual charging current and the reference charge level signal to the PWM control circuit.

5. The universal serial bus charger of claim 1, wherein the analog control circuitry further comprises:
a resistor connected in series with the connected battery; and
a current sense amplifier connected across the resistor for generating an indication of the actual charging current.

6. An apparatus, comprising:
an electronic device including a universal serial bus connection for connection to a voltage source;
a battery charger for charging a connected battery responsive to the voltage source, said battery charger comprising:
an output voltage connector for providing a charging voltage to a connected battery;
a switching voltage regulator for generating the charging voltage responsive to the voltage source and PWM switching control signals, wherein the switching voltage regulator includes a plurality of switching transistors, and at least one switching transistor of the plurality of switching transistors is connected directly to the universal serial bus connection; and analog control circuitry for monitoring an actual charging current applied to the connected battery and generating a reference charge level signal at a non-zero level, the analog control circuitry determining a difference between the actual charging current and the reference charge level signal, the analog control circuitry including a comparator for comparing the actual charging current with a charging current limit level and determining if the actual charging current exceeds the charging current limit level, and responsive to the determining, the analog control circuitry generating the reference charge level signal at a first predetermined value if the actual charging current does not exceed the charging current limit level and generating the reference charge level signal at a second predetermined value if the actual charging current exceeds the charging current limit level, the second value associated with the charging current limit level, wherein the analog control circuitry includes an analog divider circuit for receiving an input voltage from the voltage source, a battery voltage of the connected battery, and a current limit value associated with the voltage source, and generating the charging current limit level as an analog signal based on the input voltage from the voltage source, the battery voltage of the connected battery, the current limit value associated with the voltage source, and a predetermined efficiency value associated with a power conversion of the switching voltage regulator; and a PWM control circuit for generating the PWM switching control signals to control operation of the switching voltage regulator responsive to the difference between the actual charging current and the reference charge level signal at the first predetermined value when the charging current does not exceed the charging current limit level and responsive to the difference between the actual charging current and the reference charge level signal at the second predetermined value when the charging current exceeds the charging current limit level.

7. The apparatus of claim 6, wherein the analog control circuitry further includes:
a current source for providing a fixed current;
a resistor having a user selected value; and
wherein the first value for the reference charge level signal is generated responsive to the current source and the resistor.

8. The apparatus of claim 6, wherein the analog control circuitry further comprises:
the comparator for determining if the monitored actual charging current exceeds the charging current limit level and generating a switching output responsive thereto; and
a switch connected to receive the first value for the reference charge level signal and the second value of the reference charge level signal responsive to the switching output of the comparator.

9. The apparatus of claim 6, wherein the analog control circuitry further comprises an error amplifier for providing the difference between the actual charging current and the reference charge level signal to the PWM control circuit.

10. The apparatus of claim 6, wherein the analog control circuitry further comprises:
- a resistor connected in series with the connected battery; and
- a current sense amplifier connected across the resistor for generating an indication of the actual charging current.

11. A method for charging a battery through a universal serial bus connection, comprising the steps of:
- providing a direct connection from a voltage source through the universal serial bus connection and to at least one switching transistor of a voltage regulator;
- generating a charging voltage responsive to the voltage source;
- providing the charging voltage to a connected battery;
- monitoring an actual charging current applied to the connected battery analog control circuitry for;
- an analog divider circuit receiving an input voltage from the voltage source, a battery voltage of the connected battery, and an analog current limit level associated with the voltage source, and generating an analog predetermined charging current limit level signal based on the input voltage from the voltage source, the battery voltage of the connected battery, the analog current limit value associated with the voltage source, and a predetermined efficiency value associated with a conversion of power between the universal serial bus connection and the connected battery;
- comparing the actual charging current with the analog predetermined charging current limit level signal and determining if the actual charging current exceeds the analog predetermined charging current limit level signal;
- charging the battery using an analog reference charge level signal having a first value if the actual charging current does not exceed the analog predetermined charging current limit level signal; and
- charging the battery using the reference charge level signal having a second value if the actual charging current exceeds the analog predetermined charging current limit level signal, the second value associated with the analog predetermined charging current limit level signal.

12. The method of claim 11, wherein the step of charging the battery using a reference charge level signal having a first value further comprises the step of generating the actual charging current responsive to an input voltage provided by the voltage source, the monitored actual charging current, the analog predetermined charging current limit level signal and the reference charge level signal at the first value.

13. The method of claim 11, wherein the step of charging the battery using the reference charge level signal having the first value level further includes the steps of generating the reference charge level signal at the first value responsive to a fixed current source and a user selected resistance.

14. The method of claim 11, further including switching between the reference charge level signal at the first value and the second value responsive to the determination of if the actual charge current exceeds the analog predetermined charging current limit level signal.

15. The method of claim 11, wherein the step of charging further comprises the steps of:
- generating a difference between the actual charging current and the reference charge level signal; and
- controlling generation of the actual charging current responsive to the difference between the actual charging current and the reference charge level signal and the voltage source.

16. The method of claim 11, wherein the monitoring further comprises measuring a current through a current sense resistor.

17. A battery charger circuit for charging a battery from a universal serial bus (USB) port providing an input voltage, comprising:
- a switching regulator configured to charge the battery with a charging current, wherein the switching voltage regulator includes a plurality of switching transistors, and at least one switching transistor of the plurality of switching transistors is connected directly to the universal serial bus connection; and
- an analog controller coupled to the switching regulator, the analog controller including:
- analog divider circuitry configured to receive the input voltage, a battery voltage, and a current limit value associated with the USB port, and generate an analog charge current limit signal based on the input voltage, the battery voltage, the current limit value associated with the USB port, and a predetermined efficiency value associated with a power conversion of the switching regulator;
- a comparator for monitoring an analog signal representing the charging current, comparing the charging current with the analog charge current limit signal, determining if the charging current exceeds the analog charge current limit signal, and generating a switching output responsive thereto; and
- error amplifier and switching circuitry configured to generate an analog charge current target reference signal and a PWM control signal for the switching regulator responsive to the switching output and based on a difference between the analog signal representing the charging current and a current reference signal, wherein a value of the current reference signal is the lower value of the analog charge current target reference signal or the analog charge current limit signal.

18. The battery charger circuit of claim 17, wherein the analog controller comprises a PWM controller, an error amplifier coupled to an input of the PWM controller, a switching multiplexer coupled to an input of the error amplifier, a comparator coupled to a control input of the switching multiplexer, the analog charge current target reference signal coupled to a first input of the switching multiplexer, and the analog charge current limit signal coupled to a second input of the switching multiplexer.

19. The battery charger circuit of claim 17, wherein the switching regulator comprises:
- an operational amplifier coupled to the input voltage, an input of a switching multiplexer, and an input of an analog multiplier; and
- a current sense amplifier coupled to an output of the battery, a battery current sensing resistor, and an input of the switching multiplexer.

* * * * *